United States Patent [19]

Rauhut

[11] 3,893,938
[45] July 8, 1975

[54] CHEMILUMINESCENT ARTICLE OF BIS-ESTER OF OXALIC ACID AND METHOD OF PROVIDING CHEMILUMINESCENT LIGHT

[75] Inventor: Michael McKay Rauhut, Norwalk, Conn.

[73] Assignee: American Cyanamid Company, Stamford, Conn.

[22] Filed: May 14, 1973

[21] Appl. No.: 360,287

Related U.S. Application Data

[63] Continuation of Ser. No. 162,698, July 14, 1971, abandoned, which is a continuation of Ser. No. 741,517, July 1, 1968, abandoned.

[52] U.S. Cl.................252/188.3 CL; 117/33.5 R; 252/301.3 R
[51] Int. Cl............................................. C09k 3/00
[58] Field of Search............ 252/188.3 CL, 301.3 R; 117/33.5 R

[56] References Cited
UNITED STATES PATENTS

| | | | |
|---|---|---|---|
| 3,557,233 | 1/1971 | Zweig et al. | 252/188.3 CL |
| 3,677,957 | 7/1972 | Maulding | 252/188.3 CL |
| 3,704,231 | 11/1972 | Bollyky | 252/188.3 CL |
| 3,749,677 | 7/1973 | Maulding | 252/188.3 CL |

*Primary Examiner*—Stephen J. Lechert, Jr.
*Attorney, Agent, or Firm*—Gordon L. Hart; Charles J. Fickey

[57] ABSTRACT

Devices for providing chemiluminescent light from a chemical reaction of suitable oxalate-type compounds with hydroperoxides in the presence of a fluorescent compound and a diluent, in which the oxalate chemiluminescent component is incorporated with a substrate, and the component providing the reaction is applied to the substrate as a fluid, i.e., liquid or vapor.

5 Claims, 12 Drawing Figures

INVENTOR.
MICHAEL McKAY RAUHUT
BY Charles J. Hickey
ATTORNEY

PATENTED JUL 8 1975

3,893,938

SHEET 2

INVENTOR.
MICHAEL McKAY RAUHUT
BY
Charles J. Fickey
ATTORNEY

CHEMILUMINESCENT ARTICLE OF BIS-ESTER OF OXALIC ACID AND METHOD OF PROVIDING CHEMILUMINESCENT LIGHT

This is a continuation, of application Ser. No. 162,698 filed July 14, 1971, now abandoned, which is a continuation of Ser. No. 741,517, filed July 1,1968, now abandoned.

This invention relates to articles, systems and devices for providing chemiluminescent light incorporating chemical components which react chemically and provide excitation for a fluorescent compound. The invention more particularly relates to systems and devices whereby the reactive components are maintained in a non-reactive condition until light is desired, the systems incorporating means to bring said components into a reactive condition and means to display the resultant light.

Under certain circumstances, it is desirable to have a source of visible light which is not electrically activated. Light can be provided by chemical systems, wherein the luminosity is solely the result of chemical reaction without provision of any electrical energy. Such light is known as chemiluminescent light.

Chemiluminescent light may be useful where there is no source of electricity. For example, in emergencies where sources of electrical power have failed, a chemiluminescent system could provide light. Such emergencies could occur in a crash landing of an aircraft, a power failure in a submarine or in underground installations or during any electrical power failure. Moreover, chemiluminescent light is cold light and can be used where the heat of conventional illumination is not desired. It is also useful where electrical means could cause a fire hazard, such as in the presence of inflammable agents. Chemiluminescent light is also effective under water since there are no electrical connections to short out. Thus it may be seen that chemiluminescent light can have many useful applications.

A principal object of the present invention is to provide articles, systems and devices incorporating chemiluminescent components for the provision of chemiluminescent light.

A further object of this invention is to provide a means for containing chemically reactive chemiluminescent components in a non-reactive condition and means to combine said components when desired to provide chemiluminescent light.

Another object of the invention is to provide chemiluminescent lighting systems and devices having light display means.

Another object is to provide a substrate incorporating at least one chemiluminescent component in a non-reactive condition.

These and other objects of the invention will become apparent as the description thereof proceeds.

The chemiluminescent system of this invention comprises (1) a substrate having associated therewith at least one chemiluminescent component and providing for the display of chemiluminescent light. The component on the substrate may comprise a single chemiluminescent compound. The component may be a combination of a chemiluminescent compound and a fluorescent compound, or the component may be a solid component containing both a solid chemiluminescent compound and a solid hydroperoxide compound and (2) a second component comprising a solvent for said solid chemiluminescent compound, said fluorescer, if necessary, and said solid hydroperoxide compound. Where the substrate has a single chemiluminescent compound associated therewith, the second component will comprise a hydroperoxide compound and, if necessary, a fluorescer in addition to solvent. When the substrate component combines both a chemiluminescent compound and a fluorescer, the second component will comprise a hydroperoxide compound and a solvent. For chemiluminescent reaction not requiring a fluorescer, the fluorescer may be omitted. To operate the system the second component is brought into contact with the substrate in either a liquid or vapor form. Thus, a hydroperoxide in a solvent may be poured on a substrate comprising a chemiluminescent compound and a fluorescer or sprayed as a vapor or areosol in an entraining gas. The substrate, when brought into contact with the second component will provide chemiluminescent light. In one alternative, mentioned above, a chemiluminescent compound, a fluorescer and a hydroperoxide may be associated with a substrate in a solid non-reactive form. The substrate is made to emit chemiluminescent light by applying a solvent to it either in a liquid form or in the form of a vapor. Any other necessary ingredients for the production of chemiluminescent light, or for lifetime control, or for intensity improvements, or for storage stabilization must, of course, either be included in one of the two-system components or included as additional components. In particular with the preferred oxalic-type chemiluminescent compounds of this invention, a fluorescent compoung must be included in the system.

The preferred chemiluminescent light is obtained in this invention by the reaction of a hydroperoxide with a chemiluminescent composition which, in combination, comprises a chemiluminescent compound selected from the group consisting of (1) an oxalic-type anhydride of the type disclosed and claimed in the copending application, Ser. No. 485,920, filed Sept. 8, 1965, which is hereby incorporated by reference, (2) an oxalic-type amide of the type disclosed and claimed in copending applications, Ser. Nos. 520,052, filed Jan. 12, 1966, and 547,782, filed May 5, 1966, which are hereby incorporated by reference, (3) an oxalic-type O-acylhydroxylamine of the type disclosed and claimed in copending application, Ser. No. 547,761, filed May 5, 1966, and (4) an oxalic-type ester in application, Ser. No. 491,896, (abandoned Mar. 1, 1967), refiled Feb. 28, 1967 as Ser. No. 619,140, in the presence of a fluorescer compound, and a solvent. Other suitable chemiluminescent compounds are 3-aminophthalhydrazide, 2,4,5-triphenylimidazole, 10,10'-dialkyl-9,9'-biacridinium salts, and 9-chlorocarbonyl-10-methylacridinium chloride. The latter is disclosed and claimed in U.S. Pat. No. 3,352,791, issued Nov. 14, 1967. All of the foregoing provide chemiluminescence when reacted with a hydroperoxide compound and a suitable catalyst, if required. Other chemiluminescent materials are described by K. D. Gunderman, Angew. Chemie, Int. Ed., 4, 566/1965.

The preferred chemiluminescent compound of this invention is an oxalic-type ester selected from the group consisting of (a) an ester of an oxalic-type acid and an alcohol characterized by acid ionization constant in water greater than $1.3 \times 10^{-10}$, and (b) a vinyl ester of an oxalic-type ester. Similarly, in a preferred embodiment thereof, the alcohol would be an aromatic alcohol substituted by a substituent characterized by a positive Hammett sigma value. The preferred species of oxalic-type esters include bis(substituted-phenyl)oxalates such as bis(2-nitrophenyl)oxalate, bis-(2,4-dinitrophenyl)oxalate, bis(2,6-dichloro-4-nitrophenyl)oxalate, bis(2,4,6-trichlorophenyl)oxalate, bis-(3-trifluoromethyl-4-nitrophenyl)oxalate, bis(2-methyl-4,6-dinitrophenyl)oxalate, bis(1,2-dimethyl-4,6-dinitrophenyl)oxalate, bis(2,4-dichlorophenyl)oxalate, bis(2,5-dinitrophenyl)oxalate, bis(2-formyl-4-nitrophenyl)oxalate, bis(pentachlorophenyl)oxalate, bis(1,2-dihydro-2-oxo-1-pyridyl)glyoxal, bis-N-phthalmidyl oxalate. The preferred sub-species is bis(2-,4,6-trichlorophenyl)oxalate.

The peroxides employed in the components of this invention may be any hydroperoxide compound. Typical hydroperoxides include t-butylhydroperoxide, peroxybenzoic acid, and hydrogen peroxide. Hydrogen peroxide is the preferred hydroperoxide and may be employed as a solution of hydrogen peroxide in a solvent or as an anhydrous hydrogen peroxide compound such as perhydrate of urea (urea peroxide), perhydrate of pyrophosphate (sodium pyrophosphate peroxide), perhydrate of histidine (histidine peroxide), sodium perborate, sodium peroxide, and the like. Whenever hydrogen peroxide is contemplated to be employed, any suitable compound may be substituted which will produce hydrogen peroxide.

The peroxide concentration may range from about 15 molar down to about $10^{-5}$, preferably about 2 molar down to about $10^{-2}$ molar. The ester of this invention may be employed in conjunction with the substrate as a solid or in admixture with a suitable solid peroxide reactant or in a suitable diluent.

Where a solvent is employed with the hydroperoxide-containing component of this invention, said solvent can be any fluid which is unreactive toward the hydroperoxide and which accommodates a solubility of at least 0.01 M hydroperoxide. Typical solvents for the hydroperoxide component include water; alcohols, such as ethanol or octanol; ethers, such as diethyl ether, diamyl ether, tetrahydrofuran, dioxane, dibutyldiethyleneglycol, perfluoropropyl ether, and 1,2-dimethroxyethane; and esters, such as ethyl acetate, ethyl benzoate, dimethyl phthalate, dioctylphthalate, and propyl formate. Solvent combination can, of course, be used such as concentrations of the above with aromatic anisole, tetralin, and polychlorobiphenyls, providing said solvent combination accommodates hydroperoxide solubility. However, when oxalic-type chemiluminescent materials are used, strong electron donor solvents such as dimethyl formamide, dimethyl sulfonide, and hexamethylphosphoramide should not, in general, be used as a major solvent component.

Where a solvent is employed with the component containing the chemiluminescent material, any fluid can be used providing said fluid solubilizes at least 0.001 M concentration of the chemiluminescent material and is unreactive toward the chemiluminescent material. Typical solvents include ethers, esters, aromatic hydrocarbons, chlorinated aliphatic and aromatic hydrocarbons, such as those cited in the preceding paragraph. For oxalic-type chemiluminescent compounds, hydroxylic solvents such as water or alcohols and basic solvents such as pyridine should not be employed since such solvents used in general, react with and destroy oxalic-type chemiluminescent compounds. Solvent combinations may, of course, be used; but such combinations when used with oxalic-type chemiluminescent compounds should not include strong electron donor solvents.

When a component comprising a solid chemiluminescent compound and a solid hydroperoxide is used, the solvent or solvent composition comprising the second component may vary broadly. Said colvent, however, should preferably dissolve at least 0.001 M concentrations of both, the hydroperoxide and the chemiluminescent compound, and for oxalic-type chemiluminescent compounds, strong electron donor solvents should be avoided as major solvent components.

The fluorescent compounds contemplated herein are numerous; and they may be defined broadly as those which do not readily react on contact with the peroxide employed in this invention, such as hydrogen peroxide; likewise, they do not readily react on contact with the chemiluminescent compound.

A fluorescent compound is required for light emission when the preferred oxalic-type chemiluminescent compound of the invention is employed. For other types of chemiluminescent compounds a fluorescer is not required but may be used to shift the wavelength of emitted light toward the red region of the spectrum so as to change the color of emitted light. Fluorescent compounds for use with oxalic-type chemiluminescent compounds should be soluble in the reactive solvent at least to the extent of 0.0001 mole per liter and preferably to the extent of 0.001 mole per liter.

Typical suitable fluorescent compounds for use in the present invention are those which have a spectral emission falling between 330 millimicrons and 1,000 millimicrons and which are at least partially soluble in any of the above diluents, if such diluent is employed. Among these are the conjugated polycyclic aromatic compounds having at least three fused rings, such as anthracene, substituted anthracene such as 9,10-bis(phenylethynyl), benzanthracene, phenanthrene, substituted phenanthrene, naphthacene, substituted naphthacene such as rubrene of 5,11-bis(phenylethynyl)naphthacene, pentacene, substituted pentacene, and the like. Typical substituents for all of these are phenyl, lower alkyl, chlorine, bromine, cyano, alkoxy ($C_1 - C_{10}$), phenylethynyl, and other like substituents which do not interfere with the light-generating reaction contemplated herein.

Numerous other fluorescent compounds having the properties given hereinabove are well known in the art. Many of these are fully described in "Fluorescence and Phosphorescence", by Peter Pringsheim, Interscience Publishers, Inc., New York, N.Y., 1949. Other fluorescers are described in "The Colour Index," Second Edition, Volume 2, The American Association of Textile Chemists and Colorists, 1956, pp. 2,907 – 2,923. While only typical fluorescent compounds are listed hereinabove, the person skilled in the art is fully aware of the fact that this invention is not so restricted and that numerous other fluorescent compounds having similar properties are contemplated for use herein.

It should be noted, however, that although a fluorescent compound is necessary to obtain the production of light, the fluorescent compound is not necessary to obtain a chemical reaction and chemical energy release. Also, a fluorescent oxalic-type ester, such as the oxalic acid ester of 2-hydroxyanthracene, does not require a separate fluorescent compound to obtain light.

Other typical fluorescent oxalic acid esters include esters of oxalic acid (1) 2-carboxyphenol, (2) 2-carboxy-6-hydroxyphenol, (3) 1,4-dihydroxy-9,10-diphenylanthracene, and (4) 2-naphthol. Thus, a reactant including a fluorescent oxalic-type ester would thereby include at least one fluorescent compound.

It has been found that the molar (moles per liter of diluent) concentrations of the major components of the novel composition herein described may vary considerably. It is only necessary that reactants be in sufficient concentration after mixing to obtain chemiluminescence. The ester of oxalic acid molar concentration normally is in the range of at least about $10^{-4}$ to 5 molar, preferably in the range of at least about $10^{-3}$ to about 1 molar; the fluorescent compound is present in the range from about $10^{-5}$ to 5, preferably $10^{-4}$ to $10^{-1}$ molar; the hydroperoxide compound is normally present in the range of about $10^{-4}$ to 5 molar, and the diluent must be present in a sufficient amount to form at least a partial solution of the reactants involved in the chemiluminescent reaction. If the ester is liquid, it may serve as either the sole diluent or a partial diluent.

The ingredients of the composition of this invention may be admixed in a single stage of admixing or in a sequence of steps of admixing the separate ingredients.

The wavelength of the light emitted chemiluminescence of the composition of this invention, i.e., the color of the light emitted, may be varied by the addition of any one or more energy transfer agents (fluorescers) such as the known fluorescent compounds discussed at length above. The wavelength of the light emitted by the composition of this invention will vary, depending upon the particular fluorescent component employed in the reaction.

Additionally, it has been found that the superior intensity of chemiluminescence is obtained when the final mixture producing the luminescence is maintained at a temperature of between about −40°C. and 75°C., preferably between about 20°C. and 50°C. However, temperature is not critical and the luminescence of Applicant's process is not limited to these ranges.

The lifetime and the intensity of the chemiluminescent light obtained with the preferred oxalic-type chemiluminescent compounds of this invention can be regulated by the use of certain regulators such as:

1. By the addition of base to the chemiluminescent composition. Both the strength and the concentration of the base are critical for purposes of regulation.

2. By the variation of hydroperoxide. Both the type and the concentration of hydroperoxide are critical for the purposes of regulation.

3. By the addition of water.

4. By the addition of catalyst which changes the rate of reaction of hydroperoxide with the oxalic-type ester. Catalysts which accomplish that objective include those described in M. L. Bender, "Chem. Revs.", Vol. 60, p. 53 (1960). Also, catalysts which alter the rate of reaction or the rate of chemiluminescence include those accelerators of copending application, Ser. No. 577,595 (abandoned June 13, 1967), refiled Oct. 13, 1967 as Ser. No. 675,145 and decelerators of copending application, Ser. No. 577,615, filed Sept. 13, 1967.

While acids are not in general accelerators for oxalic-type chemiluminescent reactions, it should be noted specifically that acids are accelerators for the oxalic amide chemiluminescent compounds of copending application, Ser. No. 547,782.

More specifically, the advantages obtained by the corporation of a catalyst of Ser. No. 577,595 may be obtained in conjunction with the objects of this present invention, by employing, according to the copending application, an ionized salt having a cation selected from (a) an organic quaternary cation selected from the group consisting of ammonium, arsenic, and phosphorous, and (b) alkali metal having an atomic weight above 22, the salt of said cation preferably being soluble in an organic solvent and preferably being characterized by a property of forming cation-aggregates when reacted with the oxalic-type ester and a hydroperoxide. One of the advantages is the fact that an excessive amount of the chemiluminescent agent may be employed whereby a higher quantum yield may be obtained when the ionized salt is employed.

Similarly, within the scope of the present invention is the concurrent employment of one or more decelerators either alone or in the composition of this invention, or in conjunction with one or more of the accelerators discussed in the preceding paragraphs. By employing one of the accelerators of the preceding paragraph, it would be possible to employ a greater total concentration of the chemiluminescent agent while concurrently it would be possible to employ a decelerator which would prolong the period during which the light of high intensity is obtained from the chemiluminescent reaction. Such decelerators set forth in the copending application, Ser. No. 577,615, filed Sept. 13, 1967, include for example compounds such as oxalic acid, lactic acid, malonic acid, adipic acid, aluminum sulfate, sodium sulfate, barium chloride, silica and magnesium sulfate.

When oxalate-type chemiluminescent compounds are used in a solution component it may be desirable to include a stabilizing agent such as those described in copending application, Ser. No. 614,397, filed Feb. 7, 1967.

The preferred chemical compounds, components and their reactions for providing chemiluminescent light are described in copending, commonly assigned application Ser. No. 442,818 and those previously mentioned, and U.S. Pat. No. 3,329,621; and as such they do not form a part of the present invention.

The present invention is a method and means for providing chemiluminescent light wherein some of the chemiluminescent components are provided in association with a substrate and the remainder are provided as a liquid or a gas to be brought into contact with the substrate. The substrate may be any material which does not react with a chemiluminescent material in the solid state. For example, it may be paper, cloth, woven fiberglass, cellulose sponge, glass, transparent plastic, such as Mylar or cellophane sheet, translucent sheet, such as nylon or Teflon, opaque materials, such as aluminum foil or the like. The substrate may also be an elastomer, such as silicone rubber or polyisoprene. Moreover, the substrate may be in any shape, such as flat sheets, tubes (interior coated), bottles (interior coated), etc.

The substrate incorporates at least the chemiluminescent reactant, i.e., the oxalic-type compound. It may also, as previously mentioned, include a fluorescent compound and other materials as long as they are not in a form to react and provide chemiluminescent light. Thus the substrate is a storage stable item which may be activated when desired to provide light. The substrate may have the reactants coated on it or it may be impregnated with the materials.

In an alternative embodiment, one or more of the chemiluminescent ingredients may be encapsulated or microencapsulated and made adherent to the substrate. Thus all of the necessary ingredients for the production of chemiluminescent light could be non-reactively associated with the substrate. By crushing the capsules, the reactants are brought into reactive contact and chemiluminescent light provided. In this embodiment, it will not be necessary to encapsulate all ingredients. For example, the oxalate, fluorescer and hydroperoxide could be dry solids associated with the substrate and the solvent could be encapsulated. The hydroperoxide or solvent component may be brought into reactive combination in a number of ways. As previously indicated, this may be done by having these ingredients in a microencapsulated form. Reaction may also be obtained by applying a liquid solvent or hydroperoxide to the coated or impregnated substrate. The solvent or hydroperoxide may also be applied to the coated substrate in the form of a sprayed vapor or aerosol. In all of the chemiluminescent systems and reactions, the fluorescer may be on the substrate together with the chemiluminescent component or it may be incorporated with the solvent or hydroperoxide. Of course, any advantageous combination of ingredients with a substrate is within the scope of the invention.

The invention may be better understood by reference to the Figures in which.

Figure 3:
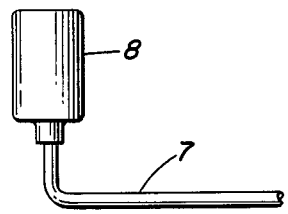
Figure 3A:
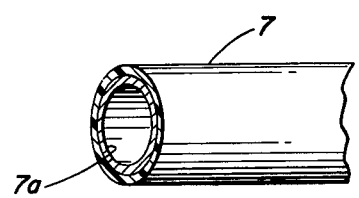
Figure 3B:
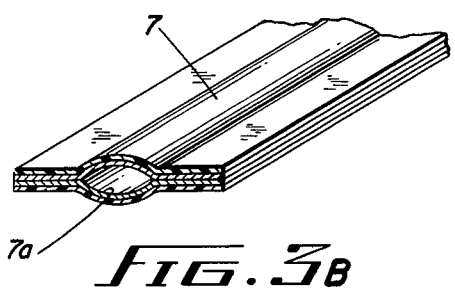

FIGS. 3, 3a, and 3b show various shaped substrates having at least a portion coated with a chemiluminescent component.

FIGS. 4, 5, 6, 6a and 6b show various packaging configurations with coated or impregnated substrates.

Figure 7:
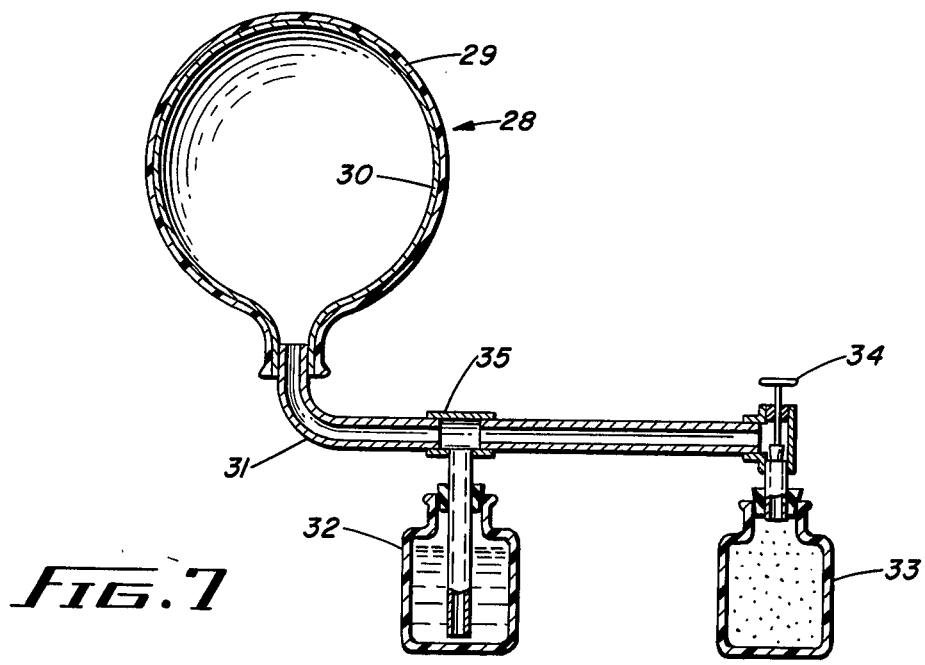

FIG. 7 shows an inflatable chemiluminescent device.

Figure 1:
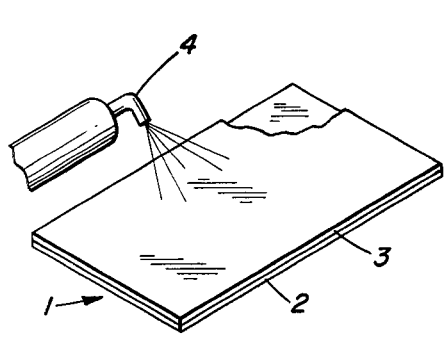
FIG. 1 shows a substrate coated with a chemiluminescent component.

Referring to FIG. 1, there is shown an embodiment of the invention having a chemiluminescent light display article 1 in the shape of a panel. Panel 1 has a substrate 2, which may be of any desired material such as paper, metal, glass, transparent, translucent or opaque plastic, cloth, screen, felt, including reflective materials such as aluminum foil. Substrate 2 is coated with a layer 3 of an oxalate chemiluminescent compound as previously described. The only limiting requirement of substrate 2 is that it be non-reactive with the oxalate compound of layer 3. For obtaining light from chemiluminescent panel 1, a hydroperoxide in a solvent is applied to the surface of coating layer 3 in the form of a vapor by means of a spray device 4. As previously described, a fluorescer is present in either the hydroperoxide or the layer 3. In addition, the hydroperoxide and fluorescer could be incorporated dry in layer 3, and spray device 4 could contain only a solvent for the dry components of layer 3. When layer 3 has been sprayed as described, a luminescent panel is obtained having a uniform emission of light over the entire surface.

Figure 2:
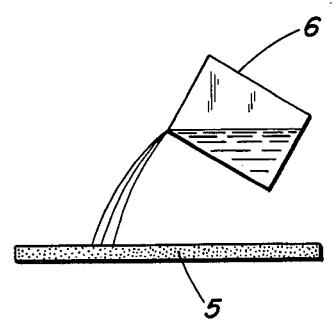
FIG. 2 shows a substrate impregnated with a chemiluminescent component.

FIG. 2 illustrates an embodiment of the invention similar to that of FIG. 1, except that a substrate 5 is impregnated with the oxalate chemiluminescent component. The activating hydroperoxide is applied in liquid form from a container 6 to obtain a chemiluminescent panel. Substrate 5 may be any material previously designated which is capable of being impregnated with a chemiluminescent compound, such as paper, cloth (including fiberglass), felt, sponge, foamed plastic and the like, and may be transparent, translucent or opaque.

It will be obvious that both the embodiments of FIGS. 1 and 2 may use either liquid or vapor application of the activating ingredient. Moreover, the basic substrates may be combined into various devices and shapes as described in greater detail in subsequent paragraphs.

In FIG. 3, a device incorporates an elongated tube 6 of a translucent or opaque material. Tube 6 may be of a round cross-section, rigid or flexible, coated on the interior surface with a layer 7a as shown in enlarged section 6a in FIG. 3a. Alternatively, tube 6 may be a collapsible tube as shown by 6b in FIG. 3b and coated on the interior with layer 6c. Tube 6 is connected to a container 8 at end 9. Container 8 represents schematically a device for providing the activating hydroperoxide or solvent to tube 6, either in liquid or vapor form. Thus no details of container 8 are illustrated since these do not form a part of the invention and numerous suitable devices would be apparent to persons skilled in the art.

Figure 4:
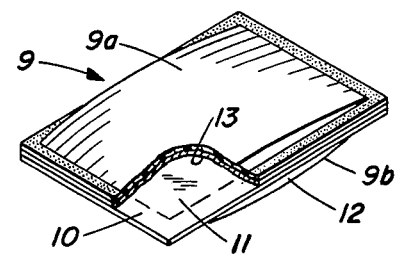
Figure 5:
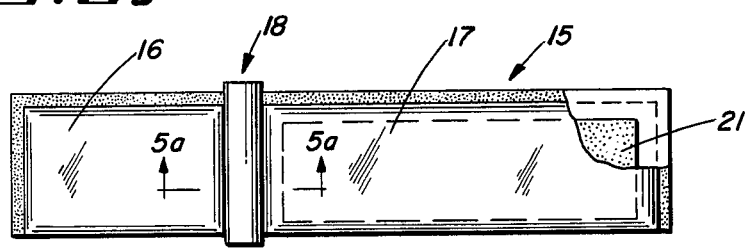
Figure 6:
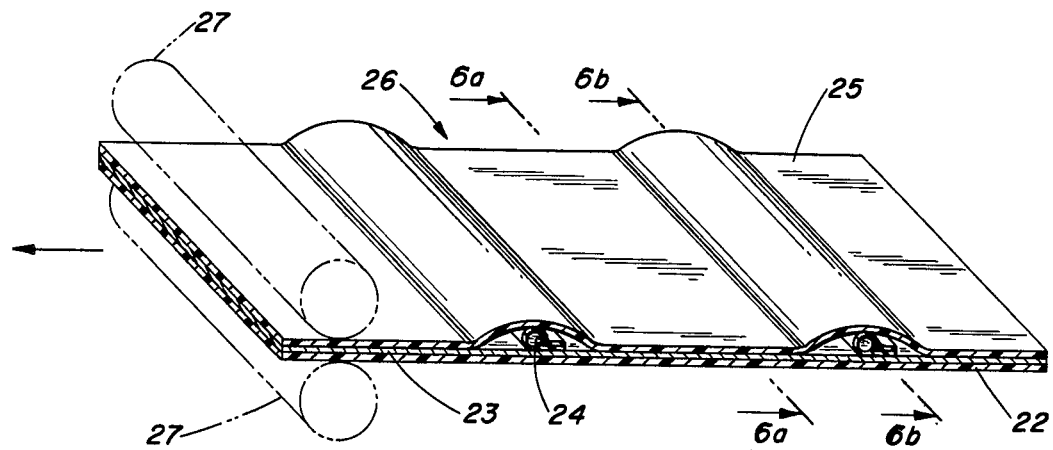

The substrate with the chemiluminescent compound may be incorporated in a package with the remaining necessary chemiluminescent ingredients as shown in FIGS. 4, 5 and 6. It is of course necessary to maintain the ingredients in a non-reactive condition until chemiluminescent light is desired. This is done by having at least the diluent in a separate pod or compartment of the package.

Referring to FIG. 4, a two-compartment package 9 has a rupturable divider 10 forming two compartments 11 and 12. The diluent, or hydroperoxide solution, is kept in compartment 12. In compartment 11, the interior face of side 9A has incorporated therewith the chemiluminescent compound 13, as a coating, for example. As previously explained, a fluorescer is incorporated either with coating 13 or in the solution in compartment 12. At least one of sides 9A and 9B should be transparent or translucent, that is, capable of transmitting light, and one side may be opaque or reflective. By exerting external pressure, divider 11 may be broken to cause the fluid component in compartment 12 to react with coating 13 to produce chemiluminescent light which is visible through the light-transmitting package. Such an arrangement provides a highly convenient, self-contained light device which may be used anywhere. It would be effective in highly moist atmospheres under water and very safe in the vicinity of highly combustible materials.

Figure 5A:
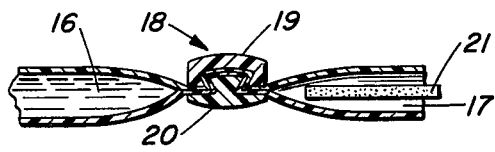

FIGS. 5 and 5a show an alternative design for a two-compartment package. Package 15 is a single envelope divided into compartments 16 and 17 by a clamp 18, consisting of elements 19 and 20. Compartment 16 contains the fluid component of the chemiluminescent systems; whereas compartment 17 contains an element 21, either coated or impregnated with the chemiluminescent compound. Removal of clip 18 causes the liquid component in compartment 16 to react with the chemiluminescent compound associated with element 21 to give chemiluminescent light. At least a part of package 15 should be light transmitting.

Figure 6A:
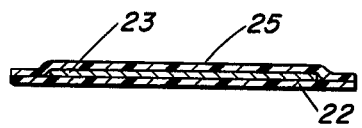
Figure 6B:
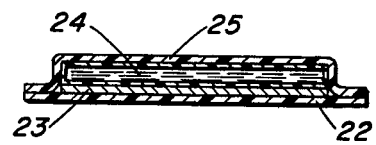

A continuous strip product, such as a tape for example may be made as shown in FIGS. 6, 6a and 6b. A base substrate 22 is coated with a layer 23 of a chemiluminescent compound. At suitable intervals, transverse pods 24 are placed to contain the liquid component of the chemiluminescent system. A cover sheet 25 is provided to enclose layer 23 and pods 24. By passing the strip assembly 26 between a set of rollers 27, pods 24 are ruptured, and the fluid component is spread over layer 23 and reacts therewith to provide chemiluminescent light. Cover sheet 25 is light transmitting, and base substrate 22 may or may not be so. Substrate 22 may be a reflective backing. A pressure sensitive adhesive may be provided to substrate 22 to affix the lighted strip to surfaces as markers. As shown at 28, perforations may be provided to tear the strip where desired. Thus the strip may be in a roll, and any length may be pulled between rollers 27, rupturing a number of rods 24 along the length, and then the strip may be torn at the length desired. A very convenient and effective chemiluminescent tape is provided in this way. By providing means between the pod areas such as transverse perforations, any desired length of tape may be separated from the remainder. It will, of course, be obvious that a chemiluminescent strip could be made in other ways. For example, transverse pods 24 could be replaced by a continuous deposit of spherical capsules or microcapsules with the liquid component.

An inflatable article is also within the scope of invention as shown in FIG. 7. A schematic representation of a balloon is shown in FIG. 7 which has an inflatable bag 29 having a chemiluminescent compound 30 associated with part or all of the interior surface thereof. The inflatable bag may be stretchable, or merely collapsible and should have at least a portion of the surface capable of transmitting light, preferably where coated with compound 20. Bag 29 is connected to a conduit 31 which leads to a container 32 containing the fluid chemiluminescent component and a container 33 with inflating gas such as carbon dioxide or nitrogen. When it is desired to inflate bag 29, a valve 34 is opened to allow the compressed inflating gas in container 33 to escape. The inflating gas in passing over opening 35 of container 32, entrains the fluid component as a vapor or aerosol and brings it into contact with chemiluminescent component 30 to cause a reaction and provide chemiluminescent light. Such a device may take the form of a life raft or an inflatable life jacket of the type, for example, popularly known as a "Mae West". The balloon can serve as a marker or signal on water, and if a lighter-than-air gas such as helium is incorporated in container 33, the device could be used for providing a signal above the surface, wither tethered or free moving.

The following specific examples are set forth to illustrate the invention and are not intended to be limitative.

EXAMPLE I

A paste comprising 5 g. of a solution of 0.04 M bis(2-,4,6-trichlorophenyl)oxalate (TCPO) and 0.004 M bis(phenylethynyl)anthracene (BPEA) in ethylbenzoate and 5 g. of polyvinylchloride resin powder was spread on a glass surface and placed in an oven at 120°C. for 7 to 10 minutes to yield on cooling a flexible elastic film. The film produced bright yellow-green chemiluminescent light when placed in solutions of 0.3 M $H_2O_2$ and 0.006 M sodium salicylate in various solvents. For equal immersion times in peroxide solution, the brightness of the light depends on the peroxide solvent in the order: triethylphosphate > dimethyloctanol > tertiarybutanol.

EXAMPLE II

Dissolving 4 g. of polymethylmethacrylate in 6 g. of a solution of 0.04 M TCPO and 0.004 M BPEA in ethylbenzoate produced a viscous solution which air dried to a brittle film when cast on a glass plate. This film gave a bright yellow-green chemiluminescence when immersed in a solution of 0.3 M $H_2O_2$ and 0.006 M sodium salicylate in acetone.

EXAMPLE III

A polyurethane sponge, 1 square foot in area and one inch in thickness was immersed in a solution of 0.08 M TCPO and 0.003 M BPEA in benzene. The treated sponge was dried by brief warming in a ventilated oven at about 50°C. The sponge was activated by treatment with a solution of 0.5 M hydrogen peroxide in a mixture of 90% dibutyl phthalate and 10% t-butyl alcohol to give a yellow-green light as in Example I.

EXAMPLE IV

A polyurethane sponge ¼ square foot in area and ½ inch thick was treated with a solution of 0.04 M TCPO and 0.003 M BPEA in ethyl benzoate. The treated sponge, while still wet with solvent, was enclosed by heat sealing in 1 mil TEFLON FEP film along with a closed 1 mil aluminum foil capsule containing 25 mil of a solution of 0.1 molar hydrogen peroxide in 3-methyl-3-pentanol. The foil pod is ruptured by squeezing the package to activate the system and provide chemiluminescent light.

EXAMPLE V

Ten square feet of ¼ inch thick rigid polystyrene foam was treated with the oxalate component of Example III and dried. The panel was activated by spraying onto it a solution of 0.1 M hydrogen peroxide in dibutylphthalate from a conventional spray gun. Bright, long-lasting light was generated from the panel. The polystyrene may be replaced by other rigid or flexible foams including polyethylene, polypropylene, and polyurethane.

EXAMPLE VI

A polypropylene carpet was treated by spraying with the oxalate component of Example III. After drying, the treated carpet was activated by spraying with the peroxide component of Example V to obtain chemiluminescent light.

EXAMPLE VII

On a conventional polyester bed sheet were painted the words "MERRY CHRISTMAS" in large block letters using a conventional brush and the oxalate component of Example III. After drying the sheet, it was sprayed with a solution of 0.1 M hydrogen peroxide and 0.001 M sodium salicylate in 3-methyl-3-pentanol. The luminescent letters appeared in sharp contrast to the non-luminescent background.

EXAMPLE VIII

A translucent reinforced polyurethane rubber balloon having a surface area of 10 square feet when inflated was partly filled while in uninflated condition with 500 ml. of a mixture of 0.04 M TCPO, 0.003 M BPEA in butyl benzoate containing 15% by weight of finely divided silica (Cab-O-Sil). The thixotropic mixture was uniformly distributed on the inner walls of the balloon. The balloon was inflated with helium from a high pressure cylinder by passing the gas through a conventional aspirator containing 0.1 M hydrogen peroxide and 0.001 M tetrabutylammonium salicylate dissolved in ethylacetate. The inflated balloon gradually became luminescent as the droplets of activated solution contacted the gelled oxalate component on the walls of the balloon.

EXAMPLE IX

One kilogram of finely divided silica (Cab-O-Sil) was treated with 5 liters of a solution of 0.06 M TCPO and 0.003 M BPEA in benzene. The mixture was well mixed in a blender and dried in a rotating oven under reduced pressure at 40°–60°C. The dried powder was placed in a conventional powder-type fire extinguisher equipped with an additional spray gun whose orifice was directed at a 45° angle toward the orifice of the fire extinguisher. The spray gun was filled with a solution of 0.6 M hydrogen peroxide and 0.004 M sodium salicylate in 3-methyl-3-pentanol. The fire extinguisher and spray gun were turned on simultaneously. The discharging powder was activated by contact with the peroxide liquid and a luminescent powder was discharged.

EXAMPLE X

The powder of Example IX was uniformly distributed on the sticky surface of a polyester tape coated with a solution of polyvinylchloride in ethylbenzoate. The tape was dried to provide a substrate for the device of FIG. 6.

EXAMPLE XI

A powder was prepared as in Example IX except that Cab-O-Sil was replaced with polyethylene flock. Similarly powders were prepared using polypropylene flock or polyacrylonitrile (CRESLAN) flock. Each of the powders were distributed over the surfaces of heated 1-mil aluminum foil 2-mil 2polyethylene laminates so as to imbed in the soft polyethylene and adhere to it. The resulting substrate is used for the device of FIG. 1.

EXAMPLE XII

A solution of 0.06 M TCPO and 0.003 M BPEA was prepared in a mixture of 50 parts benzene and 50 parts of a low molecular weight polyisobutylene (VISTANEX LM MS). The benzene was evaporated in a rotary oven under reduced pressure at 50°C., leaving an extremely viscous syrup. The syrup was employed in the device of FIG. 7.

EXAMPLE XIII

The syrup of Example XII was coated on the inner surface of a ¼-inch inside-diameter polyethylene tube to provide the substrate of FIG. 3.

EXAMPLE XIV

A pressure sensitive tape was prepared by blending 100 parts of polyisobutylene (VISTANEX MN L-100), 25 parts of VISTANEX LM-MH and 125 parts of an alkylated phenol resin with a solution of 0.06 M TCPO and 0.003 M BPEA in 3/0 ml. of benzene and coating the resulting mixture onto a translucent polyethylene strip. The tape was used in a roll-type dispenser equipped with a felt wick, so that the tape brushes over the wick and is wet as the tape is dispensed. The wick dips into a container of 0.9 M hydrogen peroxide in 3,5-dimethyl-3-octanol. Thus the tape is activated and becomes luminescent as it is dispensed. The tape can be applied to objects to establish self-luminescent markers. Since the luminescent substrate is on the underside of the polyethylene strip, it is protected from adverse environmental factors such as heavy rain or salt water spray.

EXAMPLE XV

An essentially homogeneous mixture of 50 parts polyvinylchloride, 50 parts dioctylphthalate, 4 parts TCPO and 1 part BPEA was prepared using a conventional polymer blender or a Waring blender. The mixture was extruded using conventional equipment into a film of 20 mil thickness (a wide range of film thicknesses can be obtained as desired). The resulting film was laminated by hot rolling to 0.5 mil aluminum foil. The laminate was used as the substrate to prepare the device of FIG. 4. The film can be activated with a variety of hydroperoxide reactants as in Example I.

The invention provides systems and devices for providing visible light whenever and whereever desired, independent of conventional electrical lighting methods and without the hazards of electrical lighting. The chemiluminescent lighting systems can be especially useful in emergency situations where all other forms of lighting have failed. The systems do not have the fire hazard of ignitable lighting devices such as candles, gas, or oil lights.

It will be readily apparent that the chemiluminescent systems are not confined to emergency lighting, however. They can be used at any time where a cold, safe illuminating means is desired. They are also useful to provide illumination where electrical illumination is unavailable. Such systems can also be made highly portable. Moreover, the applications and useful devices are varied and numerous in view of the possibility of using configurated display means and the ability of the chemiluminescent substrate to take such configurated forms.

While certain specific embodiments and preferred modes of practice of the invention have been described, it will be understood that this is solely for illustration, and that various changes and modifications of the invention may be made without departing from the spirit of the disclosure or the scope of the appended claims.

I claim:

1. An article of manufacture comprising a substrate in sheet form having incorporated therewith a chemiluminescent component comprising a bis-ester of oxalic acid, said substrate being inert to said component.

2. The substrate of claim 1 wherein said oxalate component is a coating on said substrate.

3. The substrate of claim 1 wherein said oxalate component is impregnated in said substrate.

4. A method for providing chemiluminescent light which comprises applying to a substrate having an oxalate-type chemiluminescent component incorporated therewith as in claim 1, a vapor capable of causing a reaction with said oxalate in the presence of a fluorescer, to produce chemiluminescence.

5. The substrate of claim 1 wherein said substrate is light transmitting.

* * * * *